US009556058B2

(12) United States Patent
Dejneka et al.

(10) Patent No.: US 9,556,058 B2
(45) Date of Patent: *Jan. 31, 2017

(54) ZIRCON COMPATIBLE GLASSES FOR DOWN DRAW

(71) Applicant: Corning Incorporated, Corning, NY (US)

(72) Inventors: Matthew John Dejneka, Corning, NY (US); Adam James Ellison, Corning, NY (US); Benjamin Zain Hanson, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/456,354

(22) Filed: Aug. 11, 2014

(65) Prior Publication Data

US 2015/0024210 A1  Jan. 22, 2015

Related U.S. Application Data (63) Continuation of application No. 12/856,840, filed on Aug. 16, 2010, now Pat. No. 8,802,581.

(60) Provisional application No. 61/235,762, filed on Aug. 21, 2009.

(51) Int. Cl.

| C03C 3/083 | (2006.01) |
|---|---|
| C03C 3/085 | (2006.01) |
| C03C 3/087 | (2006.01) |
| C03C 3/091 | (2006.01) |
| C03C 21/00 | (2006.01) |
| C03B 17/06 | (2006.01) |
| C03C 3/093 | (2006.01) |
| C03C 4/18 | (2006.01) |

(52) U.S. Cl.
CPC ............ *C03C 3/083* (2013.01); *C03B 17/064* (2013.01); *C03C 3/085* (2013.01); *C03C 3/087* (2013.01); *C03C 3/091* (2013.01); *C03C 3/093* (2013.01); *C03C 4/18* (2013.01); *C03C 21/00* (2013.01); *C03C 21/002* (2013.01); *C03C 2204/00* (2013.01); *Y10T 428/315* (2015.01)

(58) Field of Classification Search
CPC .......... C03C 3/083; C03C 3/085; C03C 3/087; C03C 3/089; C03C 3/091; C03C 21/00; C03C 21/002

See application file for complete search history.

(56) References Cited

U.S. PATENT DOCUMENTS

| 3,811,853 A | 5/1974 | Bartholomew et al. |
| 3,844,801 A | 10/1974 | Wolf |
| 5,277,946 A | 1/1994 | Nagai et al. |
| 5,721,181 A | 2/1998 | Sehgal et al. .................... 501/65 |
| 5,760,291 A | 6/1998 | Abdel-Rahman |
| 6,119,483 A | 9/2000 | Takahashi et al. .......... 65/30.14 |
| 6,551,952 B2 | 4/2003 | Wolff et al. |
| 6,716,781 B2 | 4/2004 | Wolff et al. |
| 6,818,573 B2 | 11/2004 | Petticrew ........................ 501/5 |
| 6,818,576 B2 | 11/2004 | Ikenishi et al. ................ 501/65 |
| 7,666,511 B2 * | 2/2010 | Ellison et al. ................ 428/426 |
| 8,076,014 B2 | 12/2011 | Tachiwana et al. ....... 428/846.9 |
| 8,158,543 B2 | 4/2012 | Dejneka et al. ................ 501/68 |
| 8,187,987 B2 | 5/2012 | Amin et al. |
| 8,232,218 B2 | 7/2012 | Dejneka et al. ................ 501/68 |
| 8,383,537 B2 | 2/2013 | Godard et al. |
| 8,802,581 B2 * | 8/2014 | Dejneka et al. ................ 501/68 |
| 2004/0075086 A1 | 4/2004 | Wolff et al. .................... 252/500 |
| 2006/0006786 A1 | 1/2006 | Fechner et al. |
| 2008/0020919 A1 | 1/2008 | Murata |
| 2008/0286548 A1 | 11/2008 | Ellison et al. ................ 428/220 |
| 2009/0088309 A1 | 4/2009 | Niida et al. |
| 2009/0142568 A1 | 6/2009 | Dejneka et al. ............. 428/220 |
| 2009/0197088 A1 | 8/2009 | Murata ......................... 428/410 |
| 2009/0202808 A1 | 8/2009 | Glaesemann et al. |
| 2009/0220761 A1 * | 9/2009 | Dejneka ................ C03B 17/067 428/220 |
| 2010/0009154 A1 | 1/2010 | Allan et al. .................... 428/220 |
| 2010/0035745 A1 | 2/2010 | Murata ......................... 501/66 |
| 2010/0040812 A1 | 2/2010 | Buckett et al. |
| 2010/0087307 A1 | 4/2010 | Murata et al. |
| 2011/0014475 A1 | 1/2011 | Murata ......................... 428/410 |
| 2011/0045961 A1 * | 2/2011 | Dejneka et al. ................ 501/66 |

FOREIGN PATENT DOCUMENTS

| JP | 1989226749 A | 9/1989 |
| JP | 1999310430 A | 11/1999 |
| JP | 2008165602 A | 8/2008 |
| JP | 2009084075 | 4/2009 |

(Continued)

OTHER PUBLICATIONS

Deriano et al.; "Physical and Mechanical Properties of a New Borosilicate Glass"; Ann. Chim. Sci. Mat. 28 (2003) 55-62.

Deubener et al.; "Crack tip fracture toughness of base glasses for dental restoration Mass-ceramics using crack opening displacements"; Journal of the Mechanical Behavior of Biomedical Materials 4 (2011) 1291-1298.

Horbnerger et al.; "Microstructure of a high strength alumina glass composite"; Journal of Materials Research, vol. 11, No. 4 (Apr. 1996) 855-858.

Nakai et al,; "Effect of aluminium ions on intrinsic sub-critical crack growth in metaphosphate glasses"; Journal of Non-Crystalline Solids 353 (2007) 2250-2257.

Seal et al.; "Effect of phase separation on the fracture toughness of $SiO_2$—$B_2O_3$—$Na_2O$ glass"; Bull. Mater. Sci., vol. 28, No. 5 (Aug. 2005) 457-460.

(Continued)

*Primary Examiner* — Elizabeth A Bolden
(74) *Attorney, Agent, or Firm* — Kevin M. Johnson; Timothy M. Schaeberle (57) ABSTRACT

A glass that is down-drawable and ion exchangeable. The glass has a temperature $T^{35kp}$ which the viscosity is 35 kilopoise. $T^{35kp}$ is less than the breakdown temperature $T^{breakdown}$ of zircon.

23 Claims, 4 Drawing Sheets

(56) References Cited

FOREIGN PATENT DOCUMENTS

| WO | 99/48824 | 9/1999 |
|---|---|---|
| WO | 01/49620 | 7/2001 |
| WO | 01/50464 | 7/2001 |
| WO | 02/051764 | 7/2002 |
| WO | 2009/108339 | 9/2009 |

OTHER PUBLICATIONS

Sehgal et al.; "Brittleness of glass", Journal of Non-Crystalline Solids 253 (1999) 126-132.
Simmons et al.; "Effects of Phase Separation on Crack Growth on Borosilicate Glass"; Journal of Non-Crystalline Solids 38 &39 (1980) 503-508.
Sugimura et al.; "Compositional Dependence of Mechanical Properties in Aluminosilicate, Borate and Phosphate Glasses"; Journal of the Ceramic Society of Japan 110 [12] (2002) 1103-1106.
Taniguchi et al.; "Deformation and fracture of soda-lime-silica glass under tension by molecular dynamics simulation"; Journal of the Ceramic Society of Japan 116 [8] (2008) 885-889.
West et al.; "Silica Fracture"; Journal of Materials Science 30 (1995) 6281-6287.
Wilantewicz; "The Effects of Lithium, Boron, and Magnesium Oxides on the Mechanical Properties of Silicate Glasses"; A Thesis Submitted to the Faculty of Alfred University; Alfred, NY; Jul. 1998.
Wilantewicz; "Crack Initiation Behavior of Optical Glasses from Vickers Indentation"; A Thesis Submitted to the Faculty of Alfred University; Alfred, NY; Nov. 2005.
Yoshida et al.; "Crack Growth in the High Crack Velocity Region for Binary Sodium Silicate Glasses"; Journal of the Ceramic Society of Japan 108 [10] (2000) 948-951.
Japanese Office Action JP2015134302 (A) Dated Aug. 12, 2016 Japanese Patent Office.

\* cited by examiner

ZIRCON COMPATIBLE GLASSES FOR DOWN DRAW

CROSS-REFERENCE TO RELATED APPLICATIONS

This application is a continuation of U.S. patent application Ser. No. 12/856,840, filed on Aug. 16, 2010, the contents of which is relied upon and incorporated herein by reference in their entirety, and the benefit of priority under 35 U.S.C, §120 is hereby claimed, which claims the benefit of priority under 35 U.S.C. §119(e) of U.S. Provisional Application Ser. No. 61/235,762, filed on Aug. 21, 2009.

BACKGROUND

Ion-exchangeable glasses can be manufactured in several forms by a variety of processes. In particular, such glasses can be drawn into thin sheets via either slot-draw or fusion-draw processes.

Current fusion-draw designs require zircon refractory lining and hardware for isopipes. Most ion-exchangeable glasses react with the zircon, breaking it down into silica, which dissolves in the glass, and zirconia, which forms solid inclusions that are entrained by flow into the molten glass and ends up in the final product. The attack of zircon by the molten glass continues over time and the level or concentration of zirconia inclusions in the glass increases. Because these inclusions are concentrated on the fusion line, they are also located at the point of maximum central tension after ion exchange, potentially compromising the strength of the ion-exchanged glass part. Moreover, in applications, such as in hand-held electronic devices such as PDAs, mobile phones, etc., in which small pixels of light are to be directed through the glass sheet, the high refractive index of the zirconia inclusions can block pixels. In very thin (e.g., ≤1mm thick) glass sheets, the zirconia inclusions are visible to the human eye, and constitute cosmetic defects that, in some instances, result in rejection of the part.

SUMMARY

What is provided and described herein is a glass that is down-drawable and ion exchangeable. The glass has a temperature $T^{35kp}$ which the viscosity is 35 kilopoise. $T^{35kp}$ is less than the breakdown temperature $T^{breakdown}$ of zircon.

Accordingly, one aspect of the disclosure is to provide a glass. The glass comprises $SiO_2$ and $Na_2O$ and has a temperature $T^{35kp}$ which the glass has a viscosity of 35 kpoise, wherein the temperature $T^{breakdown}$ at which zircon breaks down to form $ZrO_2$ and $SiO_2$ is greater than $T^{35kp}$.

A second aspect of the disclosure is to provide a glass. The glass comprises $SiO_2$ and $Na_2O$ and having a temperature $T^{35kp}$ at which the glass has a viscosity of 35 kpoise, wherein $SiO_2+B_2O_3 \geq 66$ mol % and $Na_2O \geq 9$ mol %, and wherein the temperature $T^{breakdown}$ at which zircon breaks down to form $ZrO_2$ and $SiO_2$ is greater than $T^{35kp}$.

A third aspect of the disclosure is a fusion-drawn glass sheet that is substantially free of fusion line zirconia defects.

These and other aspects, advantages, and salient features will become apparent from the following detailed description, the accompanying drawings, and the appended claims.

DETAILED DESCRIPTION

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range.

Referring to the drawings in general, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

If the temperature at which the zircon in the isopipe breaks down to form zirconia and silica (also referred to herein as the "breakdown temperature" or "$T^{breakdown}$") were higher than any temperature seen on the isopipe, the problem of zirconia inclusions in fusion-drawn glass (also referred to as "fusion line zirconia") would not occur. In this instance, the temperatures used to form the glass over the isopipe would be too low to create zirconia, and no such defect could form in the glass.

Because fusion is essentially an isoviscous process, the highest temperature seen by the glass corresponds to a particular viscosity of the glass. In those standard fusion-draw operations known in the art, this viscosity is about 35,000 poise ("35 kpoise" or "35 kp"), although the viscosity can be as low as about 16,000 poise during brief periods when an isopipe is being initially wet by glass. We define the difference between the breakdown temperature and the temperature corresponding to 35,000 poise viscosity as the breakdown margin $T^{margin}$, where:

$$T^{margin} = T^{breakdown} - T^{35kp}, \quad (1)$$

where $T^{35kp}$ is the temperature at which the viscosity of the glass is 35,000 poise.

When the breakdown margin $T^{margin}$ is negative, zircon will breakdown to form zirconia defects at some location on the isopipe. When $T^{margin}$ is zero, it is still possible that temperature excursions could cause zircon breakdown to occur. It is therefore desirable not only to make the breakdown margin positive, but to maximize $T^{margin}$ as much as possible while being consistent with all the other attributes that must be maintained in the final glass product.

To understand the relationship between breakdown temperature and 35 kp temperature, it is helpful to consider the reaction to form zirconia from zircon. The reaction is written thus:

$$ZrSiO_4(xtal) \rightarrow ZrO_2(xtal) + SiO_2(liq), \quad (2)$$

where $ZrSiO_4$(xtal) and $ZrO_2$(xtal) are crystalline zircon and zirconia, respectively, and $SiO_2$(liq) is liquid silica, which dissolves into the glass, produced by reaction (2).

The breakdown of zircon can be prevented by driving reaction (2) to the left. To do so, the activity (i.e., the concentration) of at least one of $ZrO_2$ or $SiO_2$ in the glass is increased. To accomplish this via $ZrO_2$ addition, the concentration of $ZrO_2$ would have to be increased until zircon became the liquidus phase. This, however, would risk creating a new, unwanted defect, secondary zircon. The remaining option is to increase the activity/concentration of $SiO_2$ in the glass. As $SiO_2$ increases at the expense of other glass components, however, the glass viscosity increases as well. Thus, the rate at which breakdown temperature increases must be balanced against the rate at which the 35 kp temperature $T^{35kp}$ increases.

In one aspect, a glass composition having a breakdown temperature $T^{breakdown}$ that is higher than the 35 kp temperature $T^{35kp}$—i.e., $T^{breakdown} > T^{35\ kp}$—is provided. The breakdown temperature is preferably higher than any viscosity that might be obtained—however briefly—during normal operation of a fusion-draw process. The composition is, in one embodiment, meltable in a conventional electric-boost, zirconia or alumina-refractory tank; i.e., the melt temperature $T^{350p}$ (i.e., the temperature corresponding to a viscosity of about 350 poise) of the glass is less than about 1650° C.

In one embodiment, the glass described herein, in addition to being down-drawable and compatible with fusion-draw processes, is ion-exchangeable so as to produce a compressive layer on the glass surface of at least 20 μm in depth and having a maximum compressive stress of at least 350 MPa. In other embodiments, the glass is ion-exchangeable so as to produce a central tension within the glass of at least 10 MPa. The glass comprises $SiO_2$ and $Na_2O$, wherein $SiO_2 + B_2O_3 \geq 66$ mol %, and $Na_2O \geq 9$ mol %. The glass, in some embodiments, further comprises at least one of $B_2O_3$, $K_2O$, MgO, and CaO. In a particular embodiment, the glass comprises: 61 mol % ≤ $SiO_2$ ≤ 75 mol %; 7 mol % ≤ $Al_2O_3$ ≤ 15 mol %; 0 mol % ≤ $B_2O_3$ ≤ 12 mol %; 9 mol % ≤ $Na_2O$ ≤ 21 mol %; 0 mol % ≤ $K_2O$ ≤ 4 mol %; 0 mol % ≤ MgO ≤ 7 mol %; and 0 mol % ≤ CaO ≤ 3 mol %. The glass, in some embodiments, further comprises at least one fining agent such as, but not limited to, a halogen or a multivalent fining agent such as $As_2O_3$, $Sb_2O_3$, $SnO_2$, and $Fe_2O_3$. In a particular embodiment, the total concentration of $As_2O_3$ and $Sb_2O_3$, if either or both are present, is less than 500 ppm by weight.

The breakdown margin $T^{margin}$ of the glass is given by the expression $$T^{margin}(° C.) = 610.6 - 41.0[Al_2O_3] + 9.9[B_2O_3] - 3.5[Na_2O] - 20.2[K_2O] - 25.6[MgO] + 34.2[CaO], \quad (3)$$

where the concentrations $[Al_2O_3]$, $[B_2O_3]$, $[Na_2O]$, $[K_2O]$, [MgO], and [CaO] are expressed in mol %. The coefficients in equation (3) have been further refined to yield the expression $$T^{margin}(° C.) = 446.6 - 50.2[Al_2O_3] + 22.6[B_2O_3] - 4.4[Na_2O] - 3.9[K_2O] - 1.2[MgO + CaO]. \quad (3a)$$

The $SiO_2$ concentration is equations (3) and (3a) is substantially accounted for by difference from the other oxides and is therefore not included in this expression. When the condition in equation (3) is satisfied, the breakdown temperature for zircon will be greater than the 35 kp temperature of the glass (i.e., $T^{breakdown} > T^{35kp}$), and fusion-line zirconia defects can thus be avoided when the glass is formed over a zircon isopipe in the fusion process.

As can be seen from the regression coefficients in equation (3), the only oxide that contributes positively to breakdown margin $T^{margin}$ is $B_2O_3$. In order to avoid excessively low breakdown temperatures, lower $SiO_2$ concentrations require higher $B_2O_3$ concentrations, since $SiO_2$ is the strongest contributor to high breakdown temperatures. The linkage between $B_2O_3$ and $SiO_2$ results in a more fundamental constraint on glass composition, namely, $SiO_2 + B_2O_3 \geq 66$ mol %.

$Na_2O$ is the essential oxide component for facilitating ion exchange, as it is removed from the glass and replaced by larger monovalent cations such as, for example, $K_2O$ during conventional ion exchange in a molten salt such as, for example, potassium nitrate ($KNO_3$). In order to obtain the minimum useful compressive stress, $Na_2O \geq 9$ mol %.

While it is desirable that the glasses described herein be compatible with existing melting processes, alternative means of melting or alternative batch materials that would enable melting harder glasses may also be used to prepare these glasses. To keep melt temperatures from becoming too high, fluxes (e.g., $B_2O_3$, alkali oxides, and alkaline earth oxides) can be kept at relatively high levels with respect to the basic glass formers $Al_2O_3$ and $SiO_2$. This can be understood from the fact that the 35 kp and 350 p temperatures "track" each other—i.e., a high 35 kp temperature also implies a high 350 p temperature. From regression equation (5) for 35 kp (shown below), high $Al_2O_3$ contents and, by inference, high $SiO_2$ contents lead to high 35 kp temperatures, and therefore to high melt temperatures. To avoid higher melt temperatures, it is desirable that $B_2O_3 + Na_2O + K_2O + MgO + CaO \geq 18$ mol %. With the exception of MgO, all of the above components also contribute to low liquidus temperature, which ensures a liquidus viscosity that is high enough to be compatible with fusion-draw processes.

In some embodiments, the liquidus viscosity of the glasses described herein is greater than 100 kPoise. The glass, when fusion drawn into a sheet, has less than one inclusion of solid $ZrO_2$ per pound of the glass sheet.

In one aspect, it is desirable that the liquidus temperature be as low as reasonably achievable to ensure a high liquidus viscosity. The relationship between liquidus temperature and composition is exceptionally complex, and no simple algorithm can be devised to account for it. However, liquidus temperature generally decreases as the concentration of alkali metal oxides in excess of aluminum (i.e., $Na_2O + K_2O - Al_2O_3$) increases, and as sodium is replaced by potassium, at least within the ranges indicated above. Likewise, liquidus temperature decreases steeply with increasing $B_2O_3$. Therefore, it is advantageous that $B_2O_3 + Na_2O + K_2O - Al_2O_3 \geq 0$ to ensure that the glass have suitably low liquidus temperature.

The glasses described herein may be fusion drawn into sheets that can be used as cover plates, windows, casings, screens, touch panels, or the like, for mobile electronic devices, such as telephones, entertainment devices, including games, music players and the like; information terminal (IT) devices, such as laptop computers; and analogous stationary versions of such devices.

Zircon breakdown temperature can be experimentally determined by one of several methods. In one method, known as the gradient strip test, a glass sample of interest is crushed and sieved to obtain a size fraction of generally less than 20 mesh. A strip of 1390 zircon refractory (Cohart) is placed in the bottom of a long, narrow platinum boat and the crushed glass is placed on top of the zircon refractory. The boat containing the refractory and glass is then loaded into a conventional gradient tube furnace that has been calibrated so that the temperature at each point in the furnace can be mapped to a specific place along the length of the boat. The gradient is set such that the low end of the furnace is at a temperature in a range from about 750° C. up to about 800° C., and the hot end is at a temperature in a range from about 1225° C. up to about 1300° C. The boat remains in the furnace for one week. After one week in the furnace, the boat is removed and the glass/refractory slab is sectioned along its length and inspected. Zirconia inclusions in the glass can be distinguished from zircon using polarized light microscopy, and further confirmation can be obtained via scanning electron microscopy. Because the furnace temperature is known along the length of the sample, the location at which zirconia first appears corresponds to a particular temperature. The estimated uncertainty in the temperature is about ±10° C.

Figure 1:
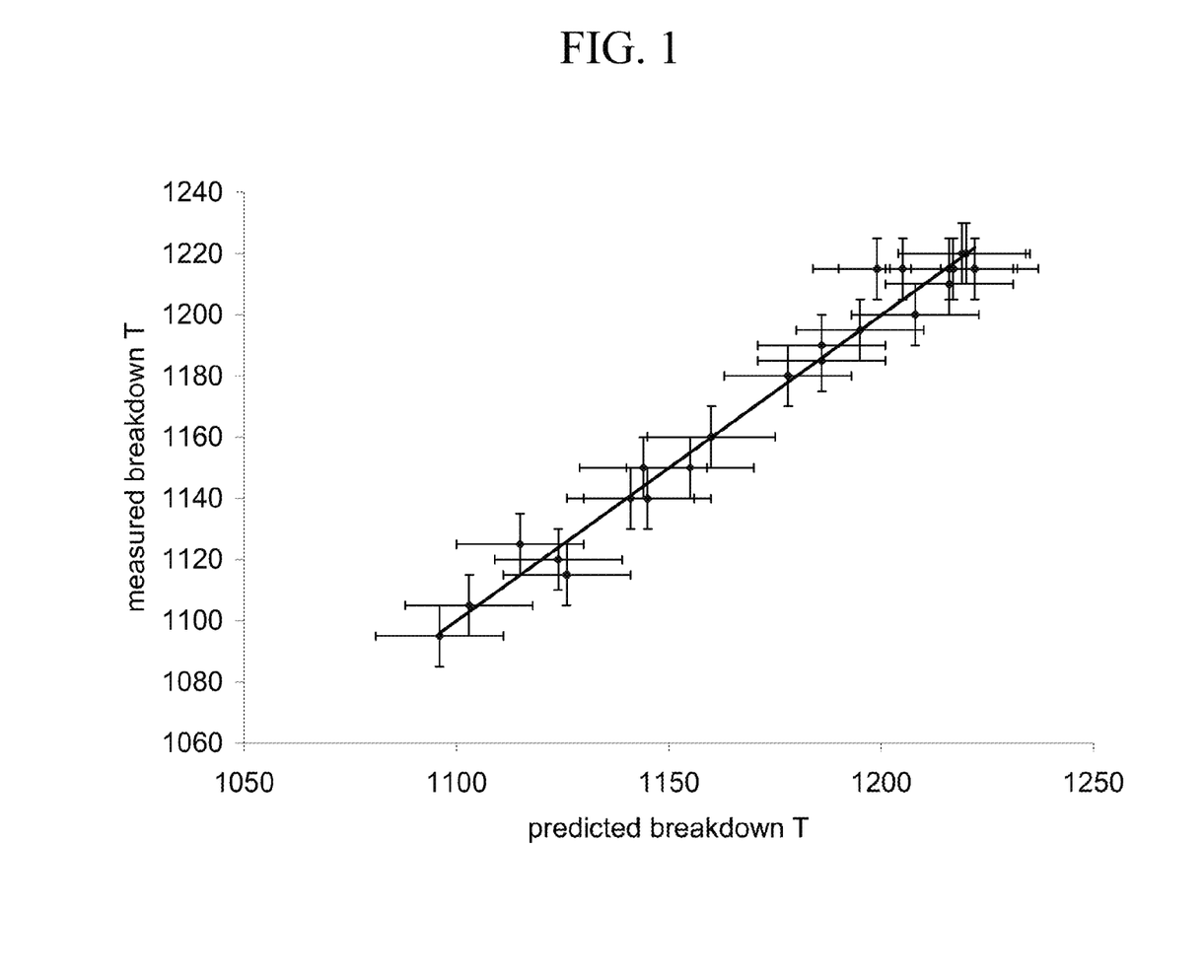
FIG. 1 is a plot of measured vs. predicted zircon breakdown temperature $T^{breakdown}$.

Compositions of glasses evaluated by the gradient strip test method are shown in Table 1, and plotted vs. predicted breakdown temperature in FIG. 1. Compositions listed in Table 1 are expressed in mol %. In FIG. 1, the y-error bars denote the measurement uncertainty of 10° C., and the x-error bars denote the 2σ standard error—15° C.—of the regression equation. The compositions listed in Table 1 are expressed in mol % and, for most of the glasses listed, are the nominal compositions. The true compositions and nominal compositions should be close for most of the glasses listed in Table 1, but for the highest boron glasses the melting process itself may well have reduced the $B_2O_3$ content of the glasses. In several cases, the breakdown temperatures ("Breakdown T") were higher than the temperature at the hot end of the gradient furnace. In these instances, it can only be established that the breakdown temperature $T^{breakdown}$ was higher than the temperature of the hot end, and a unique temperature for $T^{breakdown}$ cannot be assigned. For three of the samples (25, 26, 27) listed in Table 1, the high coefficient of thermal expansion of the glasses caused heavy crizzling or crazing of the glass at the glass-refractory interface. Consequently, it could only be determined that, for these samples, zirconia was present at up to about 1100° C., but the temperature (presumably lower) at which zircon became stable could not be determined.

Table 1 also lists predicted breakdown temperatures that were obtained by linear regression of the breakdown temperature against the mole fractions of all the major element oxides except $SnO_2$ (frequently present at a low level as a fining agent and $SiO_2$. $SiO_2$ was left out of the regression because its concentration is substantially accounted for by difference from the other oxides. The regression equation describing breakdown temperature vs. composition is as follows:

$$T^{breakdown}(\text{predicted})(° C.)=2095.1-24.0[Al_2O_3]-8.5[B_2O_3]-33.6[Na_2O]-46.2[K_2O]-24.7[MgO]-23.9[CaO], \quad (4)$$

where the concentrations in brackets are expressed in mol %. The coefficients in equation (4) have been further refined to yield the expression:

$$T^{breakdown}(\text{predicted})(° C.)=2008.8-23.5[Al_2O_3]-1.6[B_2O_3]-33.6[Na_2O]-45.5[K_2O]-10.5[MgO+CaO]. \quad (4a)$$

The standard error of the regression in equations (4) and (4a) is about 7.3° C. The 2σ uncertainty is therefore about 15° C., which is close to the estimated uncertainty of the measurement itself.

Zircon breakdown temperature can also be experimentally determined by the isothermal hold technique. In this method, glass samples are placed in small platinum boats containing zircon refractory and held at a fixed temperature for a one week duration. While the isothermal hold method does not provide a unique temperature for zircon breakdown, it does serve as a screening tool. If it is known in advance that the breakdown temperature must be higher than a threshold value, then simply holding the glass sample and several other compositions simultaneously at the threshold temperature can be used to identify those samples having breakdown temperatures either above or below the threshold temperature.

Results of isothermal hold tests for glass compositions are listed in Table 2. Compositions listed in Table 2 are expressed in mol %. For nearly all of the samples listed, the compositions in Table 2 are nominal rather than measured values. The breakdown temperature of a sample cannot be uniquely determined via this technique. However, if zirconia is not observed, the breakdown temperature must be greater than the hold temperature. Likewise, if zirconia is observed, then the breakdown temperature must be lower than the isothermal hold temperature. The "sense" of the breakdown temperature relative to the hold temperature (i.e., greater or less than the hold temperature listed under "Breakdown T" in Table 2) is indicated in Table 2. The breakdown temperature calculated using the model previously described herein is also shown for comparison. For 75 samples listed in Table 2, the predicted breakdown temperature has the correct sense relative to the hold temperature; i.e., if the predicted temperature is greater than the hold temperature, then no zirconia is seen. Likewise, if the predicted temperature is less than the hold temperature, then varying amounts of zirconia is observed.

Figure 3:
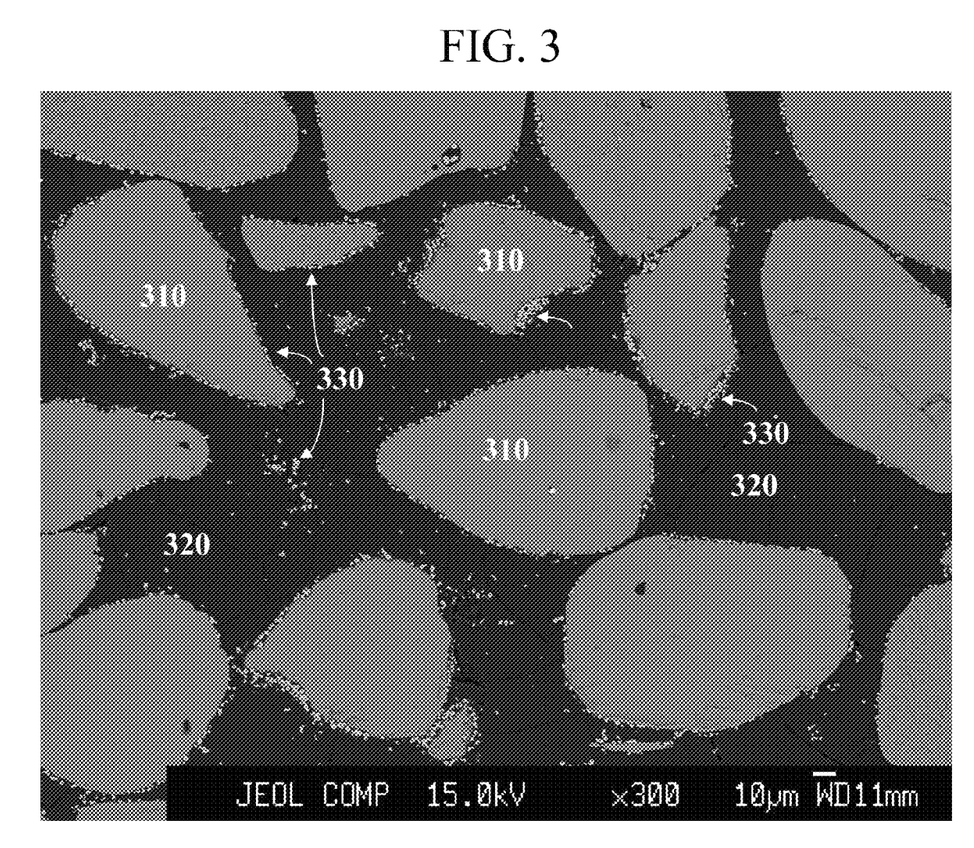
FIG. 3 is a backscattered electron micrograph of a mixture of zircon and a glass composition (composition 5, Table 1) following heat treatment at 1175° C. for 114 hours.
Figure 4:
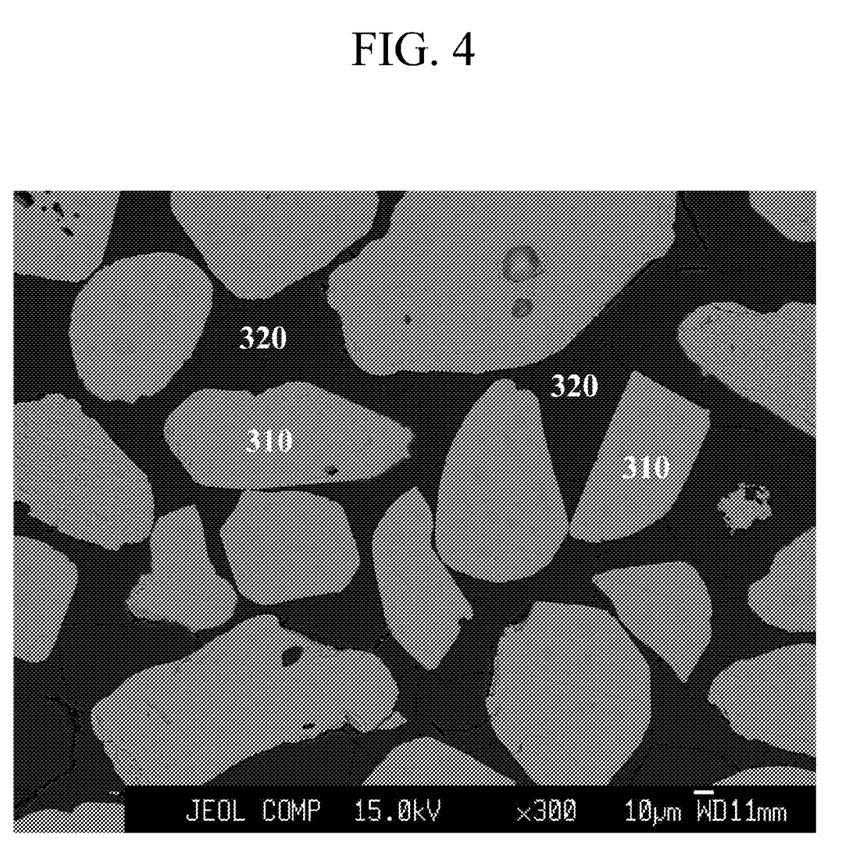
FIG. 4 is a backscattered electron micrograph of a mixture of zircon and a glass composition (composition 11, Table 1) following heat treatment at 1175° C. for 114 hours.

The difference between conventional glass having a low breakdown temperature and a glass having a high breakdown temperature, such as those disclosed herein is illustrated in FIGS. 3 and 4. FIG. 3 shows a backscattered electron micrograph of a glass composition (composition 5 in Table 1) having a low breakdown temperature, and FIG. 4 shows a backscattered electron micrograph of a glass compositions (composition 11 in Table 1) having a high zircon breakdown temperature. Both glasses were mixed with zircon grains and loaded into Pt boats, which were then placed in a furnace at 1175° C. for 114 hrs. The samples were then removed form the furnace, air quenched, and later cut and polished for inspection. As seen in FIG. 3, the sample containing glass composition 5, which has a breakdown temperature of 1105° C., clearly shows zirconia grains resulting from zircon breakdown. The zircon has reacted with the glass, as evidenced by the decoration of each of the zircon grains 310 (the grey phase in FIG. 3) with a large number of smaller zirconia grains 330 (white phase) just inside the glass 320 (dark phase). In contrast, the sample containing glass composition 11, which has a breakdown temperature of 1180° C., did not undergo zircon breakdown. FIG. 4 shows that zircon grains 310 and glass are present, but no zirconia grains were observed.

Relative amounts of zirconia observed for each sample are also listed in Table 2, and are described in relative amounts ("High," "Medium," "Trace," and "None"). The relative amounts of zirconia observed also track the breakdown temperature. If $T^{breakdown}$ is predicted to be much lower than the hold temperature, a large amount of zirconia is observed. When the predicted $T^{breakdown}$ is close to the isothermal hold temperature, only a trace of zirconia is observed. In the last ten samples listed in Table 2, the predicted sense of the breakdown temperature is not the same as observed, but all are within $2\sigma$ of the predicted breakdown temperature, and hence within the uncertainty of the prediction.

Two deficiencies are associated with the gradient strip and isothermal hold tests. First, the long exposures at high temperature that are used in both tests can produce volatilization of certain glass components—particularly $B_2O_3$—which can in turn impact the breakdown temperature of the glass. As discussed hereinabove, an increase in $SiO_2$ causes the breakdown temperature to increase. Since $SiO_2$ typically comprises more than 60 mol % of all the oxides present in the glasses described herein, the absolute $SiO_2$ concentration in the glass increases the most when a volatile component such as $B_2O_3$ is lost. Furthermore, at least one volatile component from a glass containing both $Na_2O$ and $B_2O_3$ is $Na_2B_4O_7$, so both sodium and boron can be lost. Thus, the breakdown temperature for a glass having a high $B_2O_3$ concentration is likely to be an overestimate of the actual $T^{breakdown}$ and the glass composition should be verified following the test. Second, the breakdown of zircon is very slow. Consequently, the one week hold time used in both types of tests may in some cases be insufficient to reveal an observable degree of breakdown. In general, both of these problems lead to observation of higher-than-expected breakdown temperatures.

Figure 2:
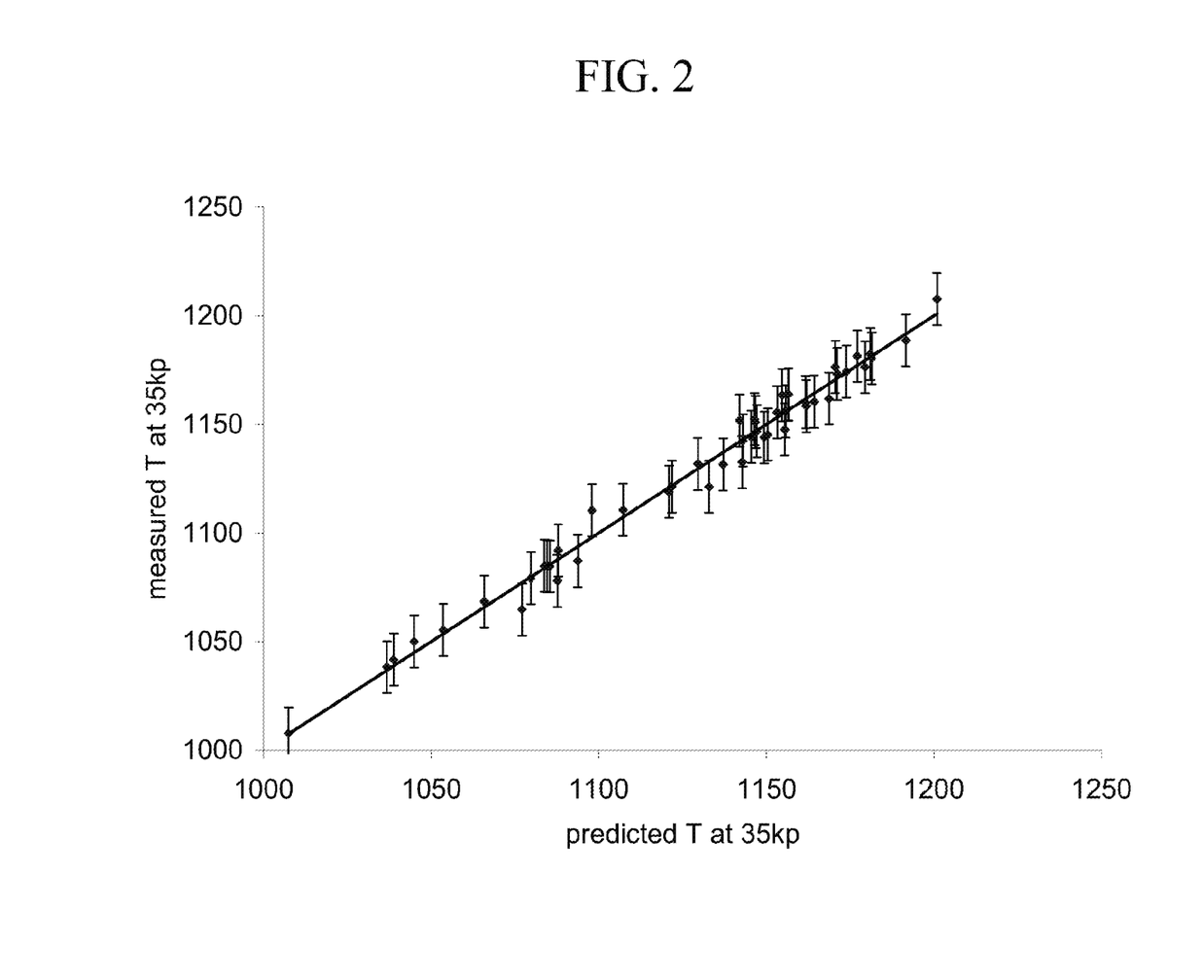
FIG. 2 is a plot of measured values vs. predicted 35 kp temperatures $T^{35kp}$.

Viscosity measurements were separately performed on a broad composition range of ion-exchangeable glasses. When the temperature is regressed to the temperature at which the viscosity of the glass is 35,000 poise ($T^{35kp}$), a linear correlation with composition is obtained:

$$T^{35kp}(°C.)=1484.5+17.1[Al_2O_3]-18.4[B_2O_3]-30.1[Na_2O]-26.0[K_2O]+0.9[MgO]-58.1[CaO], \quad (5)$$

with a standard error of 5.8° C., and thus a propagated $2\sigma$ uncertainty of 11.6° C. Measured values of $T^{35kp}$ are plotted against predicted 35 kp temperatures in FIG. 2, and show good correlation between values predicted in equation (5) and measured values. The coefficients in equation (5) have been further refined to yield the expression:

$$T^{35kp}(°C.)=1562.2+26.7[Al_2O_3]-24.2[B_2O_3]-38[Na_2O]-41.6[K_2O]-9.3[MgO+CaO]. \quad (5a)$$

Since the breakdown temperature $T^{breakdown}$ exceeds the 35 kp temperature $T^{35kp}$, equations (1), (4), and (5) are combined to give equation (3):

$$T^{margin}=610.6-41.0[Al_2O_3]+9.9[B_2O_3]-3.5[Na_2O]-20.2[K_2O]-25.6[MgO]+34.2[CaO]. \quad (3)$$

The coefficients in equation (3) have been further refined to yield equation (3a):

$$T^{margin}(°C.)=446.6-50.2[Al_2O_3]+22.6[B_2O_3]-4.4[Na_2O]-3.9[K_2O]-1.2[MgO+CaO]. \quad (3a)$$

Exemplary glasses that satisfy equation (3) are listed in Table 3. Compositions listed in Table 3 are expressed in mol %.

In some embodiments, it is desirable that the zircon breakdown temperature is as high as possible, and preferably a temperature that is greater than any experienced on the isopipe. The propagated $2\sigma$ uncertainty is 19° C. To ensure that the breakdown temperature will be greater than any temperature in the isopipe, 19° C. can be subtracted from the regression coefficient in equations (3) and (3a) to account for any uncertainty:

$$T^{margin}=591.6-41.0[Al_2O_3]+9.9[B_2O_3]-3.5[Na_2O]-20.2[K_2O]-25.6[MgO]+34.2[CaO], \quad (6)$$

$$T^{margin}(°C.)=427.6-50.2[Al_2O_3]+22.6[B_2O_3]-4.4[Na_2O]-3.9[K_2O]-1.2[MgO+CaO]. \quad (6a)$$

There is, however, sufficient flexibility in the fusion process to deliver glass at viscosities that are both lower and higher than 35 kp. Equation (3) could therefore be adopted, aiming for as high a breakdown margin $T^{margin}$ as possible. The glass delivery temperature could then be adjusted if the required product attributes do not produce a predicted breakdown margin $T^{margin}$ of greater than 19° C.

The glass compositions listed in Table 3 have a 350 poise temperature $T^{350}$ (i.e., the temperature at which the glass is typically melted) that is less than or equal to 1650° C., which is desirable for reducing gaseous and solid inclusions at production scale melt rates. In addition, all of the compositions are ion exchangeable by those methods widely known in the art. In the ion exchange process, smaller metal ions in the glass are replaced or "exchanged" by larger metal ions of the same valence within a layer that is close to the outer surface of the glass. The replacement of smaller ions with larger ions creates a compressive stress within the layer. In one embodiment, the metal ions are monovalent alkali metal ions (e.g., $Na^+$, $K^+$, $Rb^+$, and the like), and ion exchange is accomplished by immersing the glass in a bath comprising at least one molten salt of the larger metal ion that is to replace the smaller metal ion in the glass. Alternatively, other monovalent ions such as $Ag^+$, $Tl^+$, $Cu^+$, and the like may be exchanged for monovalent ions. The ion exchange process or processes that are used to strengthen the glass can include, but are not limited to, immersion in a single bath or multiple baths of like or different compositions with washing and/or annealing steps between immersions.

In one embodiment, the glasses listed in Table 3 are ion exchanged by exposure to molten $KNO_3$ at a temperature of 410° C. for 8 hours to produce a compressive stress layer having a depth (also referred to as a "depth of layer") of at least 20 μm on the surface of the glass and a maximum compressive stress of at least 350 MPa. In another embodiment the glasses listed in Table 3 are ion exchanged to achieve a central tension of at least 10 MPa.

TABLE 1

Gradient strip zircon breakdown temperatures.

| Sample | $SiO_2$ | $Al_2O_3$ | $B_2O_3$ | $Na_2O$ | $K_2O$ | MgO | CaO | $SnO_2$ | Breakdown T (° C.) | Predicted breakdown T (° C.) | Breakdown margin (° C.) |
|---|---|---|---|---|---|---|---|---|---|---|---|
| 1 | 61.94 | 13.99 | 5.99 | 13.99 | 2 | 2 | 0 | 0.1 | 1095 | 1096 | −46 |
| 2 | 63.94 | 11.99 | 5.99 | 15.98 | 2 | 0 | 0 | 0.1 | 1115 | 1126 | 81 |
| 3 | 64.09 | 13.2 | 5.66 | 12.25 | 2.83 | 1.89 | 0 | 0.09 | 1140 | 1141 | −24 |

TABLE 1-continued

Gradient strip zircon breakdown temperatures.

| Sample | SiO$_2$ | Al$_2$O$_3$ | B$_2$O$_3$ | Na$_2$O | K$_2$O | MgO | CaO | SnO$_2$ | Breakdown T (° C.) | Predicted breakdown T (° C.) | Breakdown margin (° C.) |
|---|---|---|---|---|---|---|---|---|---|---|---|
| 4 | 63.94 | 11.99 | 5.99 | 13.99 | 2 | 2 | 0 | 0.1 | 1150 | 1144 | 37 |
| 5 | 66.12 | 10.19 | 0.58 | 14.16 | 2.37 | 5.75 | 0.59 | 0.21 | 1105 | 1103 | −27 |
| 6 | 66.01 | 11.25 | 0.6 | 14.2 | 1.35 | 4.76 | 1.61 | 0.2 | 1120 | 1124 | 10 |
| 7 | 67.34 | 12.33 | 0 | 20.33 | 0 | 0 | 0 | 0 | 1125 | 1115 | 32 |
| 8 | 67.85 | 9.21 | 0.54 | 14.16 | 2.34 | 5.22 | 0.46 | 0.19 | 1140 | 1145 | 23 |
| 9 | 64.8 | 12.8 | 4.8 | 17.6 | 0 | 0 | 0 | 0 | 1150 | 1155 | 70 |
| 10 | 68.07 | 9.72 | 0.57 | 13.21 | 2.31 | 5.39 | 0.54 | 0.18 | 1160 | 1160 | 4 |
| 11 | 68.68 | 9.54 | 0.56 | 12.92 | 2.27 | 5.29 | 0.53 | 0.18 | 1180 | 1178 | 16 |
| 12 | 69.25 | 9.03 | 0.39 | 13.41 | 2.21 | 5.04 | 0.47 | 0.18 | 1185 | 1186 | 39 |
| 13 | 62.26 | 13.27 | 9.6 | 14.87 | 0 | 0 | 0 | 0 | 1195 | 1195 | 108 |
| 14 | 70.25 | 8.86 | 0 | 13.43 | 1.67 | 5.18 | 0.41 | 0.17 | 1210 | 1216 | 47 |
| 15 | 70.19 | 8.6 | 0 | 14.28 | 1.19 | 5.1 | 0.44 | 0.18 | 1215 | 1217 | 67 |
| 16 | 70.72 | 8.67 | 0 | 13 | 2.16 | 5.19 | 0.05 | 0.17 | 1220 | 1220 | 34 |
| 17 | 69.96 | 8.60 | 0.55 | 14.03 | 1.21 | 4.97 | 0.45 | 0.20 | 1215 | 1222 | 77 |
| 18 | 69.85 | 8.71 | 0.05 | 14.27 | 1.26 | 5.18 | 0.47 | 0.19 | 1200 | 1208 | 61 |
| 19 | 69.86 | 8.65 | 0.03 | 14.17 | 1.2 | 5.05 | 0.49 | 0.18 | 1220 | 1219 | 69 |
| 20 | 70.11 | 8.68 | 0.03 | 14.22 | 1.2 | 5.06 | 0.49 | 0.18 | 1215 | 1216 | 67 |
| 21 | 69.25 | 9.03 | 0.39 | 13.41 | 2.21 | 5.04 | 0.47 | 0.18 | 1190 | 1186 | 39 |
| 22 | 69.41 | 8.55 | 0 | 14.05 | 1.19 | 6.17 | 0.44 | 0.19 | 1215 | 1199 | 43 |
| 23 | 65.19 | 10.19 | 6.2 | 12.06 | 2.68 | 1.81 | 0.78 | 0.1 | 1215 | 1205 | 137 |
| 24 | 70.92 | 8.52 | 0 | 13.7 | 1.17 | 5.11 | 0.36 | 0.19 | >1245 | 1241 | 70 |
| 25 | 62.97 | 8.91 | 2.23 | 15.46 | 4.84 | 5.34 | 0.08 | 0.15 | <1090 | 985 | −20 |
| 26 | 64.88 | 9.18 | 2.29 | 14.43 | 3.49 | 5.49 | 0.07 | 0.15 | <1100 | 1071 | −3 |
| 27 | 64.87 | 9.18 | 0.8 | 14.42 | 4.99 | 5.5 | 0.07 | 0.15 | <1100 | 1015 | −49 |
| 28 | 72.16 | 8.13 | 0 | 13.27 | 1.03 | 4.81 | 0.42 | 0.16 | >1245 | 1277 | 100 |
| 29 | 73.51 | 7.6 | 0 | 11.58 | 2.3 | 4.2 | 0.6 | 0.2 | >1250 | 1299 | 124 |
| 30 | 73.14 | 7.19 | 0 | 12.54 | 2.16 | 4.72 | 0.05 | 0.18 | >1250 | 1283 | 108 |
| 31 | 73.52 | 7.6 | 0 | 13.87 | 0 | 4.2 | 0.61 | 0.2 | >1260 | 1328 | 163 |
| 32 | 65.7 | 8 | 10 | 15.7 | 0.6 | 0 | 0 | 0.08 | >1260 | 1262 | 314 |
| 33 | 65.91 | 10.3 | 6.27 | 12.19 | 2.71 | 1.83 | 0.79 | 0.1 | 1230 | 1195 | 132 |

TABLE 2

Results from isothermal zircon breakdown experiments.

| Sample | SiO$_2$ | Al$_2$O$_3$ | B2O$_3$ | Na$_2$O | K$_2$O | MgO | CaO | SnO$_2$ | Zirconia amount | Breakdown T (° C.) | Predicted breakdown T (° C.) |
|---|---|---|---|---|---|---|---|---|---|---|---|
| 34 | 65 | 11.25 | 0.6 | 14.25 | 2.35 | 5.75 | 0.6 | 0.2 | High | <1150 | 1076 |
| 35 | 64 | 12.25 | 0.6 | 14.25 | 2.35 | 5.75 | 0.6 | 0.2 | High | <1150 | 1052 |
| 36 | 64 | 11.25 | 0.6 | 14.25 | 2.35 | 5.75 | 1.6 | 0.2 | High | <1150 | 1052 |
| 37 | 62 | 12.25 | 0.6 | 14.25 | 2.35 | 5.75 | 2.6 | 0.2 | High | <1150 | 1004 |
| 6 | 66 | 11.25 | 0.6 | 14.25 | 1.35 | 4.75 | 1.6 | 0.2 | Trace | <1150 | 1123 |
| 38 | 66 | 12.25 | 0.6 | 14.25 | 0.35 | 3.75 | 2.6 | 0.2 | Medium | <1150 | 1146 |
| 39 | 66 | 11.3 | 0.6 | 14.2 | 1.4 | 5.2 | 1.1 | 0.2 | Medium | <1150 | 1122 |
| 40 | 66 | 11.3 | 0.6 | 14.2 | 1.4 | 5.7 | 0.6 | 0.2 | Medium | <1150 | 1121 |
| 41 | 65.35 | 11.19 | 1.58 | 14.06 | 1.34 | 4.7 | 1.58 | 0.2 | Medium | <1150 | 1124 |
| 42 | 65.34 | 11.19 | 1.58 | 14.06 | 1.39 | 5.15 | 1.09 | 0.2 | Medium | <1150 | 1122 |
| 29 | 73.5 | 7.6 | 0 | 11.6 | 2.3 | 4.2 | 0.6 | 0.2 | None | >1190 | 1298 |
| 43 | 72.55 | 8.2 | 0 | 11.8 | 2.3 | 4.35 | 0.6 | 0.2 | None | >1190 | 1273 |
| 44 | 71.6 | 8.85 | 0 | 12 | 2.3 | 4.45 | 0.6 | 0.2 | None | >1190 | 1248 |
| 45 | 70.7 | 9.45 | 0 | 12.2 | 2.3 | 4.55 | 0.6 | 0.2 | None | >1190 | 1225 |
| 46 | 69.75 | 10.05 | 0 | 12.4 | 2.3 | 4.7 | 0.6 | 0.2 | None | >1190 | 1200 |
| 47 | 69.87 | 8.77 | 0.56 | 12.67 | 2.27 | 5.14 | 0.53 | 0.18 | None | >1170 | 1209 |
| 48 | 71.04 | 8 | 0.56 | 12.42 | 2.27 | 4.99 | 0.53 | 0.18 | None | >1170 | 1240 |
| 49 | 72.22 | 7.22 | 0.56 | 12.17 | 2.27 | 4.84 | 0.53 | 0.18 | None | >1170 | 1270 |
| 50 | 5170.43 | 8.77 | 0 | 12.67 | 2.27 | 5.14 | 0.53 | 0.18 | None | >1170 | 1214 |
| 51 | 71.61 | 7.99 | 0 | 12.42 | 2.27 | 4.99 | 0.53 | 0.18 | None | >1170 | 1245 |
| 52 | 72.78 | 7.22 | 0 | 12.17 | 2.27 | 4.84 | 0.53 | 0.18 | None | >1170 | 1275 |
| 16 | 70.72 | 8.67 |  | 13 | 2.16 | 5.19 | 0.05 | 0.17 | None | >1190 | 1220 |
| 53 | 71.61 | 7.99 | 0 | 12.95 | 2.27 | 4.99 | 0 | 0.18 | None | >1190 | 1239 |
| 30 | 73.14 | 7.19 |  | 12.54 | 2.16 | 4.72 | 0.05 | 0.18 | None | >1190 | 1283 |
| 54 | 72.22 | 7.22 | 0 | 12.17 | 3.36 | 4.84 | 0 | 0.18 | None | >1190 | 1238 |
| 55 | 72.22 | 7.22 | 0 | 14.26 | 2.27 | 3.84 | 0 | 0.18 | None | >1190 | 1242 |
| 56 | 72.22 | 7.22 | 0 | 13.26 | 3.27 | 3.84 | 0 | 0.18 | None | >1190 | 1230 |
| 57 | 73.5 | 7.6 | 0 | 12.75 | 1.15 | 4.2 | 0.6 | 0.2 | None | >1200 | 1312 |
| 58 | 73.5 | 7.6 | 0 | 13.9 | 0 | 4.2 | 0.6 | 0.2 | None | >1200 | 1327 |
| 59 | 72.55 | 8.2 | 0 | 12.95 | 1.15 | 4.35 | 0.6 | 0.2 | None | >1200 | 1288 |
| 60 | 72.55 | 8.2 | 0 | 14.1 | 0 | 4.35 | 0.6 | 0.2 | None | >1200 | 1302 |
| 61 | 73.94 | 7.65 | 0 | 13.98 | 0 | 4.23 | 0 | 0.2 | None | >1200 | 1337 |

TABLE 2-continued

Results from isothermal zircon breakdown experiments.

| Sample | SiO₂ | Al₂O₃ | B₂O₃ | Na₂O | K₂O | MgO | CaO | SnO₂ | Zirconia amount | Breakdown T (° C.) | Predicted breakdown T (° C.) |
|---|---|---|---|---|---|---|---|---|---|---|---|
| 62 | 72.98 | 8.25 | 0 | 14.19 | 0 | 4.38 | 0 | 0.2 | None | >1200 | 1311 |
| 63 | 73.5 | 7.6 | 0 | 11.6 | 2.3 | 4.2 | 0.6 | 0.2 | None | >1200 | 1298 |
| 31 | 73.5 | 7.6 | 0 | 13.9 | 0 | 4.2 | 0.6 | 0.2 | None | >1200 | 1327 |
| 64 | 62.93 | 12.99 | 5 | 16.98 | 2 | 0 | 0 | 0.1 | Medium | <1100 | 1077 |
| 65 | 61.94 | 13.99 | 5.99 | 15.98 | 2 | 0 | 0 | 0.1 | High | <1150 | 1078 |
| 66 | 61.93 | 13.99 | 5.99 | 13.99 | 4 | 0 | 0 | 0.1 | High | <1150 | 1053 |
| 67 | 61.93 | 13.99 | 5.99 | 13.99 | 2 | 2 | 0 | 0.1 | Medium | <1150 | 1096 |
| 68 | 61.93 | 13.99 | 5 | 16.98 | 2 | 0 | 0 | 0.1 | High | <1150 | 1053 |
| 69 | 61.93 | 13.99 | 4 | 17.98 | 2 | 0 | 0 | 0.1 | High | <1150 | 1028 |
| 8 | 67.87 | 9.21 | 0.54 | 14.16 | 2.34 | 5.22 | 0.46 | 0.19 | Trace | <1170 | 1145 |
| 70 | 67.732 | 9.696 | 0.6185 | 13.336 | 2.3738 | 5.5414 | 0.4871 | 0.1855 | Trace | <1170 | 1150 |
| 71 | 68.67 | 8.54 | 0.56 | 13.96 | 2.27 | 5.29 | 0.53 | 0.18 | Trace | <1190 | 1167 |
| 72 | 71.15 | 7.78 | 0.51 | 12.93 | 2.09 | 4.87 | 0.49 | 0.18 | None | >1190 | 1240 |
| 73 | 71.16 | 8.03 | 0 | 13.18 | 2.09 | 4.87 | 0.49 | 0.18 | None | >1190 | 1230 |
| 74 | 63.94 | 12.99 | 8.99 | 13.99 | 0 | 0 | 0 | 0.1 | None | >1200 | 1236 |
| 75 | 63.94 | 13.49 | 8.99 | 13.49 | 0 | 0 | 0 | 0.1 | None | >1200 | 1241 |
| 76 | 63.94 | 13.99 | 8.99 | 12.99 | 0 | 0 | 0 | 0.1 | None | >1200 | 1246 |
| 77 | 63.94 | 14.49 | 7.99 | 13.49 | 0 | 0 | 0 | 0.1 | None | >1200 | 1225 |
| 78 | 63.94 | 12.49 | 9.99 | 13.49 | 0 | 0 | 0 | 0.1 | None | >1200 | 1256 |
| 79 | 63.94 | 13.49 | 8.99 | 11.49 | 2 | 0 | 0 | 0.1 | None | >1200 | 1216 |
| 80 | 63.94 | 14.49 | 6.99 | 14.49 | 0 | 0 | 0 | 0.1 | None | >1200 | 1200 |
| 81 | 63.94 | 12.49 | 10.99 | 12.49 | 0 | 0 | 0 | 0.1 | None | >1200 | 1281 |
| 82 | 63.94 | 11.99 | 11.99 | 11.99 | 0 | 0 | 0 | 0.1 | None | >1200 | 1302 |
| 83 | 63.94 | 13.49 | 7.99 | 13.49 | 0 | 1 | 0 | 0.1 | None | >1200 | 1225 |
| 84 | 63.94 | 13.49 | 6.99 | 13.49 | 0 | 2 | 0 | 0.1 | None | >1200 | 1208 |
| 85 | 68.67 | 9.68 | 0 | 13.37 | 2.27 | 5.29 | 0.53 | 0.18 | None | >1170 | 1165 |
| 86 | 68.67 | 9.54 | 0 | 13.51 | 2.27 | 5.29 | 0.53 | 0.18 | Trace | <1200 | 1163 |
| 15 | 70.194 | 8.6009 | 0 | 14.283 | 1.1848 | 5.098 | 0.4377 | 0.1751 | None | >1200 | 1217 |
| 14 | 70.223 | 8.8623 | 0 | 13.422 | 1.6727 | 5.1828 | 0.4383 | 0.1716 | None | >1200 | 1215 |
| 87 | 71.27 | 8.24 | 0 | 12.9 | 2.08 | 4.85 | 0.48 | 0.17 | None | >1200 | 1236 |
| 88 | 67.2 | 12.31 | 0 | 20.29 | 0 | 0 | 0 | 0.2 | Medium | <1150 | 1117 |
| 89 | 67.01 | 12.35 | 0.36 | 20.08 | 0 | 0 | 0 | 0.2 | High | <1150 | 1120 |
| 90 | 66.82 | 12.38 | 0.72 | 19.88 | 0 | 0 | 0 | 0.2 | High | <1150 | 1123 |
| 91 | 68.32 | 11.82 | 0.69 | 18.97 | 0 | 0 | 0 | 0.2 | None | >1150 | 1167 |
| 92 | 67.77 | 10.84 | 0.36 | 20.83 | 0 | 0 | 0 | 0.2 | Trace | <1150 | 1131 |
| 93 | 67.57 | 10.88 | 0.72 | 20.63 | 0 | 0 | 0 | 0.2 | Trace | <1150 | 1134 |
| 94 | 67.2 | 11.31 | 0 | 19.29 | 0 | 2 | 0 | 0.2 | Medium | <1150 | 1125 |
| 95 | 67.02 | 11.34 | 0.36 | 19.08 | 0 | 2 | 0 | 0.2 | Medium | <1150 | 1129 |
| 96 | 66.82 | 11.38 | 0.72 | 18.88 | 0 | 2 | 0 | 0.2 | Trace | <1150 | 1131 |
| 97 | 68.7 | 10.74 | 0 | 18.36 | 0 | 2 | 0 | 0.2 | None | >1150 | 1170 |
| 98 | 68.52 | 10.78 | 0.34 | 18.16 | 0 | 2 | 0 | 0.2 | None | >1150 | 1173 |
| 99 | 68.31 | 10.82 | 0.69 | 17.98 | 0 | 2 | 0 | 0.2 | None | >1150 | 1175 |
| 100 | 66.14 | 10.19 | 0.58 | 14.16 | 2.37 | 5.75 | 0.59 | 0.21 | Medium | <1150 | 1103 |
| 101 | 66 | 12.3 | 0 | 14.2 | 0.35 | 4.75 | 1.6 | 0.2 | None | >1150 | 1145 |
| 102 | 61.88 | 13.97 | 5.99 | 17.96 | 0 | 0 | 0 | 0.2 | Trace | <1100 | 1105 |
| 103 | 68.67 | 10.04 | 0.56 | 12.46 | 2.27 | 5.29 | 0.53 | 0.18 | None | >1190 | 1182 |
| 104 | 63.94 | 13.49 | 5.99 | 13.49 | 0 | 3 | 0 | 0.1 | None | >1200 | 1192 |
| 105 | 69.06 | 9.59 | 0 | 13.03 | 2.28 | 5.32 | 0.53 | 0.18 | None | >1190 | 1177 |
| 106 | 68.7 | 11.74 | 0 | 19.36 | 0 | 0 | 0 | 0.2 | Trace | <1150 | 1162 |
| 107 | 68.52 | 11.78 | 0.34 | 19.16 | 0 | 0 | 0 | 0.2 | Trace | <1150 | 1165 |
| 108 | 67.96 | 13.05 | 0 | 18.79 | 0 | 0 | 0 | 0.2 | Trace | <1150 | 1150 |
| 109 | 67.78 | 13.08 | 0.36 | 18.58 | 0 | 0 | 0 | 0.2 | Medium | <1150 | 1153 |
| 110 | 67.58 | 13.12 | 0.72 | 18.38 | 0 | 0 | 0 | 0.2 | Trace | <1150 | 1156 |
| 111 | 69.57 | 8.43 | 0 | 13.95 | 1.16 | 6.18 | 0.5 | 0.18 | None | >1200 | 1206 |
| 112 | 69.9 | 8.3 | 0 | 13.81 | 1.15 | 6.14 | 0.49 | 0.18 | None | >1200 | 1215 |
| 113 | 69.4 | 8.36 | 0 | 14.29 | 1.06 | 6.18 | 0.5 | 0.18 | None | >1200 | 1201 |
| 114 | 69.95 | 8.23 | 0 | 14.01 | 1.04 | 6.07 | 0.5 | 0.18 | None | >1200 | 1217 |

TABLE 3

Glass compositions that satisfy equation (3).

| Sample | SiO₂ | Al₂O₃ | B₂O₃ | Na₂O | K₂O | MgO | CaO | SnO₂ | Breakdown T (° C.) | Predicted breakdown T (° C.) | 35 kp prediction | margin predict |
|---|---|---|---|---|---|---|---|---|---|---|---|---|
| 6 | 66.01 | 11.25 | 0.6 | 14.2 | 1.35 | 4.76 | 1.61 | 0.2 | 1120 | 1124 | 1113 | 11 |
| 38 | 66 | 12.25 | 0.6 | 14.25 | 0.35 | 3.75 | 2.6 | 0.2 | <1150 | 1146 | 1096 | 50 |
| 41 | 65.35 | 11.19 | 1.58 | 14.06 | 1.34 | 4.7 | 1.58 | 0.2 | <1150 | 1124 | 1100 | 24 |
| 29 | 73.51 | 7.6 | 0 | 11.58 | 2.3 | 4.2 | 0.6 | 0.2 | >1250 | 1299 | 1175 | 124 |
| 43 | 72.55 | 8.2 | 0 | 11.8 | 2.3 | 4.35 | 0.6 | 0.2 | >1190 | 1273 | 1178 | 95 |

TABLE 3-continued

Glass compositions that satisfy equation (3).

| Sample | SiO$_2$ | Al$_2$O$_3$ | B$_2$O$_3$ | Na$_2$O | K$_2$O | MgO | CaO | SnO$_2$ | Breakdown T (° C.) | Predicted breakdown T (° C.) | 35 kp prediction | margin predict |
|---|---|---|---|---|---|---|---|---|---|---|---|---|
| 44 | 71.6 | 8.85 | 0 | 12 | 2.3 | 4.45 | 0.6 | 0.2 | >1190 | 1248 | 1184 | 64 |
| 45 | 70.7 | 9.45 | 0 | 12.2 | 2.3 | 4.55 | 0.6 | 0.2 | >1190 | 1225 | 1188 | 37 |
| 46 | 69.75 | 10.05 | 0 | 12.4 | 2.3 | 4.7 | 0.6 | 0.2 | >1190 | 1200 | 1192 | 8 |
| 47 | 69.87 | 8.77 | 0.56 | 12.67 | 2.27 | 5.14 | 0.53 | 0.18 | >1170 | 1209 | 1157 | 52 |
| 48 | 71.04 | 8 | 0.56 | 12.42 | 2.27 | 4.99 | 0.53 | 0.18 | >1170 | 1240 | 1151 | 89 |
| 49 | 72.22 | 7.22 | 0.56 | 12.17 | 2.27 | 4.84 | 0.53 | 0.18 | >1170 | 1270 | 1145 | 125 |
| 50 | 70.43 | 8.77 | 0 | 12.67 | 2.27 | 5.14 | 0.53 | 0.18 | >1170 | 1214 | 1167 | 47 |
| 51 | 71.61 | 7.99 | 0 | 12.42 | 2.27 | 4.99 | 0.53 | 0.18 | >1170 | 1245 | 1162 | 83 |
| 52 | 72.78 | 7.22 | 0 | 12.17 | 2.27 | 4.84 | 0.53 | 0.18 | >1170 | 1275 | 1156 | 119 |
| 16 | 70.72 | 8.67 |  | 13 | 2.16 | 5.19 | 0.05 | 0.17 | >1190 | 1220 | 1187 | 33 |
| 16 | 70.72 | 8.67 | 0 | 13 | 2.16 | 5.19 | 0.05 | 0.17 | 1220 | 1220 | 1187 | 33 |
| 53 | 71.61 | 7.99 | 0 | 12.95 | 2.27 | 4.99 | 0 | 0.18 | >1190 | 1239 | 1176 | 63 |
| 30 | 73.14 | 7.19 | 0 | 12.54 | 2.16 | 4.72 | 0.05 | 0.18 | >1250 | 1283 | 1175 | 108 |
| 54 | 72.22 | 7.22 | 0 | 12.17 | 3.36 | 4.84 | 0 | 0.18 | >1190 | 1238 | 1158 | 80 |
| 55 | 72.22 | 7.22 | 0 | 14.26 | 2.27 | 3.84 | 0 | 0.18 | >1190 | 1242 | 1123 | 119 |
| 56 | 72.22 | 7.22 | 0 | 13.26 | 3.27 | 3.84 | 0 | 0.18 | >1190 | 1230 | 1127 | 103 |
| 57 | 73.5 | 7.6 | 0 | 12.75 | 1.15 | 4.2 | 0.6 | 0.2 | >1200 | 1312 | 1169 | 143 |
| 58 | 73.5 | 7.6 | 0 | 13.9 | 0 | 4.2 | 0.6 | 0.2 | >1200 | 1327 | 1164 | 163 |
| 59 | 72.55 | 8.2 | 0 | 12.95 | 1.15 | 4.35 | 0.6 | 0.2 | >1200 | 1288 | 1174 | 114 |
| 60 | 72.55 | 8.2 | 0 | 14.1 | 0 | 4.35 | 0.6 | 0.2 | >1200 | 1302 | 1169 | 133 |
| 61 | 73.94 | 7.65 | 0 | 13.98 | 0 | 4.23 | 0 | 0.2 | >1200 | 1337 | 1198 | 139 |
| 62 | 72.98 | 8.25 | 0 | 14.19 | 0 | 4.38 | 0 | 0.2 | >1200 | 1311 | 1202 | 109 |
| 63 | 73.5 | 7.6 | 0 | 11.6 | 2.3 | 4.2 | 0.6 | 0.2 | >1200 | 1298 | 1174 | 124 |
| 31 | 73.52 | 7.6 | 0 | 13.87 | 0 | 4.2 | 0.61 | 0.2 | >1260 | 1328 | 1165 | 163 |
| 102 | 61.88 | 13.97 | 5.99 | 17.96 | 0 | 0 | 0 | 0.2 | <1100 | 1105 | 1072 | 33 |
| 2 | 63.94 | 11.99 | 5.99 | 15.98 | 2 | 0 | 0 | 0.1 | 1115 | 1126 | 1046 | 80 |
| 4 | 63.94 | 11.99 | 5.99 | 13.99 | 2 | 2 | 0 | 0.1 | 1150 | 1144 | 1107 | 37 |
| 64 | 62.93 | 12.99 | 5 | 16.98 | 2 | 0 | 0 | 0.1 | <1100 | 1077 | 1051 | 26 |
| 10 | 68.07 | 9.72 | 0.57 | 13.21 | 2.31 | 5.39 | 0.54 | 0.18 | 1160 | 1160 | 1155 | 5 |
| 11 | 68.68 | 9.54 | 0.56 | 12.92 | 2.27 | 5.29 | 0.53 | 0.18 | 1180 | 1178 | 1163 | 15 |
| 8 | 67.85 | 9.21 | 0.54 | 14.16 | 2.34 | 5.22 | 0.46 | 0.19 | 1140 | 1145 | 1122 | 23 |
| 71 | 68.67 | 8.54 | 0.56 | 13.96 | 2.27 | 5.29 | 0.53 | 0.18 | <1190 | 1167 | 1114 | 53 |
| 72 | 71.15 | 7.78 | 0.51 | 12.93 | 2.09 | 4.87 | 0.49 | 0.18 | >1190 | 1240 | 1140 | 100 |
| 73 | 71.16 | 8.03 | 0 | 13.18 | 2.09 | 4.87 | 0.49 | 0.18 | >1190 | 1230 | 1146 | 84 |
| 74 | 63.94 | 12.99 | 8.99 | 13.99 | 0 | 0 | 0 | 0.1 | >1200 | 1236 | 1119 | 117 |
| 75 | 63.94 | 13.49 | 8.99 | 13.49 | 0 | 0 | 0 | 0.1 | >1200 | 1241 | 1143 | 98 |
| 76 | 63.94 | 13.99 | 8.99 | 12.99 | 0 | 0 | 0 | 0.1 | >1200 | 1246 | 1166 | 80 |
| 77 | 63.94 | 14.49 | 7.99 | 13.49 | 0 | 0 | 0 | 0.1 | >1200 | 1225 | 1178 | 47 |
| 78 | 63.94 | 12.49 | 9.99 | 13.49 | 0 | 0 | 0 | 0.1 | >1200 | 1256 | 1107 | 149 |
| 79 | 63.94 | 13.49 | 8.99 | 11.49 | 2 | 0 | 0 | 0.1 | >1200 | 1216 | 1151 | 65 |
| 80 | 63.94 | 14.49 | 6.99 | 14.49 | 0 | 0 | 0 | 0.1 | >1200 | 1200 | 1167 | 33 |
| 81 | 63.94 | 12.49 | 10.99 | 12.49 | 0 | 0 | 0 | 0.1 | >1200 | 1281 | 1119 | 162 |
| 82 | 63.94 | 11.99 | 11.99 | 11.99 | 0 | 0 | 0 | 0.1 | >1200 | 1302 | 1107 | 195 |
| 83 | 63.94 | 13.49 | 7.99 | 13.49 | 0 | 1 | 0 | 0.1 | >1200 | 1225 | 1162 | 63 |
| 84 | 63.94 | 13.49 | 6.99 | 13.49 | 0 | 2 | 0 | 0.1 | >1200 | 1208 | 1181 | 27 |
| 85 | 68.67 | 9.68 | 0 | 13.37 | 2.27 | 5.29 | 0.53 | 0.18 | >1170 | 1165 | 1162 | 3 |
| 105 | 69.06 | 9.59 | 0 | 13.03 | 2.28 | 5.32 | 0.53 | 0.18 | >1190 | 1177 | 1170 | 7 |
| 32 | 65.7 | 8 | 10 | 15.7 | 0.6 | 0 | 0 | 0.08 | >1260 | 1262 | 948 | 314 |
| 86 | 68.67 | 9.54 | 0 | 13.51 | 2.27 | 5.29 | 0.53 | 0.18 | <1200 | 1163 | 1155 | 8 |
| 15 | 70.19 | 8.6 | 0 | 14.28 | 1.19 | 5.1 | 0.44 | 0.18 | 1215 | 1217 | 1149 | 68 |
| 14 | 70.25 | 8.86 | 0 | 13.43 | 1.67 | 5.18 | 0.41 | 0.17 | 1210 | 1216 | 1169 | 47 |
| 87 | 71.27 | 8.24 | 0 | 12.9 | 2.08 | 4.85 | 0.48 | 0.18 | >1200 | 1236 | 1159 | 77 |
| 28 | 72.16 | 8.13 | 0 | 13.27 | 1.03 | 4.81 | 0.42 | 0.16 | >1245 | 1277 | 1177 | 100 |
| 22 | 69.41 | 8.55 | 0 | 14.05 | 1.19 | 6.17 | 0.44 | 0.19 | 1215 | 1199 | 1156 | 43 |
| 24 | 70.92 | 8.52 | 0 | 13.7 | 1.17 | 5.11 | 0.36 | 0.19 | >1260 | 1241 | 1171 | 70 |
| 20 | 70.11 | 8.68 | 0.03 | 14.22 | 1.2 | 5.06 | 0.49 | 0.18 | 1215 | 1216 | 1149 | 67 |
| 23 | 65.19 | 10.19 | 6.2 | 12.06 | 2.68 | 1.81 | 0.78 | 0.1 | 1215 | 1205 | 1068 | 137 |
| 12 | 69.25 | 9.03 | 0.39 | 13.41 | 2.21 | 5.04 | 0.47 | 0.18 | 1185 | 1186 | 1147 | 39 |
| 17 | 69.96 | 8.60 | 0.55 | 14.03 | 1.21 | 4.97 | 0.45 | 0.20 | 1215 | 1222 | 1145 | 77 |
| 18 | 69.85 | 8.71 | 0.05 | 14.27 | 1.26 | 5.18 | 0.47 | 0.19 | 1200 | 1208 | 1147 | 61 |
| 19 | 69.86 | 8.65 | 0.03 | 14.17 | 1.2 | 5.05 | 0.49 | 0.18 | 1220 | 1219 | 1150 | 69 |
| 33 | 65.91 | 10.3 | 6.27 | 12.19 | 2.71 | 1.83 | 0.79 | 0.1 | 1230 | 1195 | 1063 | 132 |
| 13 | 62.26 | 13.27 | 9.6 | 14.87 | 0 | 0 | 0 | 0 | 1195 | 1195 | 1086 | 109 |
| 9 | 64.8 | 12.8 | 4.8 | 17.6 | 0 | 0 | 0 | 0 | 1150 | 1155 | 1085 | 70 |
| 7 | 67.34 | 12.33 | 0 | 20.33 | 0 | 0 | 0 | 0 | 1125 | 1115 | 1083 | 32 |
| 88 | 67.2 | 12.31 | 0 | 20.29 | 0 | 0 | 0 | 0.2 | <1150 | 1117 | 1084 | 33 |
| 89 | 67.01 | 12.35 | 0.36 | 20.08 | 0 | 0 | 0 | 0.2 | <1150 | 1120 | 1084 | 36 |
| 90 | 66.82 | 12.38 | 0.72 | 19.88 | 0 | 0 | 0 | 0.2 | <1150 | 1123 | 1084 | 39 |
| 106 | 68.7 | 11.74 | 0 | 19.36 | 0 | 0 | 0 | 0.2 | <1150 | 1162 | 1102 | 60 |
| 107 | 68.52 | 11.78 | 0.34 | 19.16 | 0 | 0 | 0 | 0.2 | <1150 | 1165 | 1102 | 63 |
| 91 | 68.32 | 11.82 | 0.69 | 18.97 | 0 | 0 | 0 | 0.2 | >1150 | 1167 | 1102 | 65 |
| 108 | 67.96 | 13.05 | 0 | 18.79 | 0 | 0 | 0 | 0.2 | <1150 | 1150 | 1141 | 9 |
| 109 | 67.78 | 13.08 | 0.36 | 18.58 | 0 | 0 | 0 | 0.2 | <1150 | 1153 | 1142 | 11 |
| 110 | 67.58 | 13.12 | 0.72 | 18.38 | 0 | 0 | 0 | 0.2 | <1150 | 1156 | 1142 | 14 |

TABLE 3-continued

Glass compositions that satisfy equation (3).

| Sample | SiO$_2$ | Al$_2$O$_3$ | B$_2$O$_3$ | Na$_2$O | K$_2$O | MgO | CaO | SnO$_2$ | Breakdown T (° C.) | Predicted breakdown T (° C.) | 35 kp prediction | margin predict |
|---|---|---|---|---|---|---|---|---|---|---|---|---|
| 92 | 67.77 | 10.84 | 0.36 | 20.83 | 0 | 0 | 0 | 0.2 | <1150 | 1131 | 1036 | 95 |
| 93 | 67.57 | 10.88 | 0.72 | 20.63 | 0 | 0 | 0 | 0.2 | <1150 | 1134 | 1036 | 98 |
| 94 | 67.2 | 11.31 | 0 | 19.29 | 0 | 2 | 0 | 0.2 | <1150 | 1125 | 1098 | 27 |
| 95 | 67.02 | 11.34 | 0.36 | 19.08 | 0 | 2 | 0 | 0.2 | <1150 | 1129 | 1099 | 30 |
| 96 | 66.82 | 11.38 | 0.72 | 18.88 | 0 | 2 | 0 | 0.2 | <1150 | 1131 | 1099 | 32 |
| 97 | 68.7 | 10.74 | 0 | 18.36 | 0 | 2 | 0 | 0.2 | >1150 | 1170 | 1117 | 53 |
| 98 | 68.52 | 10.78 | 0.34 | 18.16 | 0 | 2 | 0 | 0.2 | >1150 | 1173 | 1117 | 56 |
| 99 | 68.31 | 10.82 | 0.69 | 17.98 | 0 | 2 | 0 | 0.2 | >1150 | 1175 | 1117 | 58 |
| 111 | 69.57 | 8.43 | 0 | 13.95 | 1.16 | 6.18 | 0.5 | 0.18 | >1200 | 1206 | 1155 | 52 |
| 112 | 69.9 | 8.3 | 0 | 13.81 | 1.15 | 6.14 | 0.49 | 0.18 | >1200 | 1215 | 1158 | 58 |
| 113 | 69.4 | 8.36 | 0 | 14.29 | 1.06 | 6.18 | 0.5 | 0.18 | >1200 | 1201 | 1146 | 55 |
| 114 | 69.95 | 8.23 | 0 | 14.01 | 1.04 | 6.07 | 0.5 | 0.18 | >1200 | 1217 | 1153 | 65 |

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A glass comprising SiO$_2$, Al$_2$O$_3$, and alkali oxides selected from the group consisting of Na$_2$O and K$_2$O, wherein SiO$_2$+B$_2$O$_3$≥66 mol %, 15 mol %≥Al$_2$O$_3$≥7 mol %, B$_2$O$_3$≤7 mol %, Na$_2$O≥9 mol %, K$_2$O≤2.37 mol %, B$_2$O$_3$+Na$_2$O+K$_2$O+MgO+CaO≥18 mol %, and CaO≤2 mol %, wherein 610.6 mol %−41.0[Al$_2$O$_3$]+9.9[B$_2$O$_3$]−3.5[Na$_2$O]−20.2[K$_2$O]−25.6[MgO]+34.2[CaO]≥0, where concentrations [Al$_2$O$_3$], [B$_2$O$_3$], [Na$_2$O], [K$_2$O], [MgO], and [CaO] are expressed in mol %.

2. The glass of claim 1, wherein the glass comprises: 61 mol %≤SiO$_2$≤75 mol %; 7 mol %≤Al$_2$O$_3$≤15 mol %; 0 mol %≤ B$_2$O$_3$≤7 mol %; 9 mol %≤Na$_2$O≤21 mol %; 0 mol %≤ K$_2$O≤2.37 mol %; 0 mol %≤MgO≤7 mol %; and 0 mol %≤ CaO≤2 mol %.

3. The glass of claim 1, wherein the glass is downdrawable.

4. The glass of claim 1, wherein the glass is fusion drawn into a glass sheet.

5. The glass of claim 4, wherein the glass sheet has less than one inclusion of solid ZrO$_2$ per pound of glass sheet.

6. The glass of claim 1, wherein B$_2$O$_3$+Na$_2$O+K$_2$O−Al$_2$O$_3$≥0 mol %.

7. The glass of claim 1, wherein the glass has a liquidus viscosity of greater than about 100 kpoise.

8. The glass of claim 1, wherein the glass has a 350 poise temperature T$^{350}$ of less than or equal to 1650° C.

9. The glass of claim 1, wherein the glass is formed into one of a cover plate, a window, a casing, a display screen, and a touch panel of an electronic device.

10. The glass of claim 1, wherein the glass has a temperature T$^{35kp}$ at which the glass has a viscosity of 35 kpoise and a zircon breakdown temperature T$^{breakdown}$ at which zircon breaks down to form ZrO$_2$ and SiO$_2$, wherein T$^{breakdown}$ is greater than T$^{35kp}$.

11. The glass of claim 1, wherein the glass is ion exchanged to form a compressive layer on at least one surface of the glass.

12. The glass of claim 11, wherein the ion exchanged glass has a compressive stress of at least 350 MPa and a compressive depth of layer of at least 20 microns.

13. A glass comprising SiO$_2$, Al$_2$O$_3$, and alkali oxides selected from the group consisting of Na$_2$O and K$_2$O, wherein 15 mol %≥Al$_2$O$_3$≥7 mol %, B$_2$O$_3$≤7 mol %, Na$_2$O≥9 mol %, K$_2$O≤2.37 mol %, CaO≤2 mol %, SiO$_2$+B$_2$O$_3$≥66 mol %, and B$_2$O$_3$+Na$_2$O+K$_2$O+MgO+CaO≥18 mol %, wherein the glass has a temperature T$^{35kp}$ at which the glass has a viscosity of 35 kpoise, and a zircon breakdown temperature T$^{breakdown}$ at which zircon breaks down to form ZrO$_2$ and SiO$_2$, wherein T$^{breakdown}$ is greater than T$^{35kp}$, and wherein T$^{margin}$=T$^{breakdown}$−T$^{35kp}$, where T$^{margin}$=610.6 mol %−41.0[Al$_2$O$_3$]+9.9[B$_2$O$_3$]−3.5[Na$_2$O]−20.2[K$_2$O]−25.6[MgO]+34.2[CaO] where concentrations [Al$_2$O$_3$], [B$_2$O$_3$], [Na$_2$O], [K$_2$O], [MgO], and [CaO] are expressed in mol %, and wherein T$^{margin}$≥0.

14. The glass of claim 13, wherein the glass comprises: 61 mol %≤SiO$_2$≤75 mol %; 7 mol %≤Al$_2$O$_3$≤15 mol %; 0 mol %≤B$_2$O$_3$≤7 mol %; 9 mol %≤Na$_2$O≤21 mol %; 0 mol %≤K$_2$O≤2.37 mol %; 0 mol %≤MgO≤7 mol %; and 0 mol %≤CaO≤2 mol %.

15. The glass of claim 13, wherein the glass is downdrawable.

16. The glass of claim 13, wherein the glass is fusion drawn into a glass sheet.

17. The glass of claim 16, wherein the glass sheet has less than one inclusion of solid ZrO$_2$ per pound of glass sheet.

18. The glass of claim 13, wherein B$_2$O$_3$+Na$_2$O+K$_2$O−Al$_2$O$_3$≥0 mol %.

19. The glass of claim 13, wherein the glass has a liquidus viscosity of greater than about 100 kpoise.

20. The glass of claim 13, wherein the glass has a 350 poise temperature T$^{350}$ of less than or equal to 1650° C.

21. The glass of claim 13, wherein the glass is formed into one of a cover plate, a window, a casing, a display screen, and a touch panel of an electronic device.

22. The glass of claim 13, wherein the glass is ion exchanged to form a compressive layer on at least one surface of the glass.

23. The glass of claim 22, wherein the ion exchanged glass has a compressive stress of at least 350 MPa and a compressive depth of layer of at least 20 microns.

\* \* \* \* \*

UNITED STATES PATENT AND TRADEMARK OFFICE
CERTIFICATE OF CORRECTION

Page 1 of 1

PATENT NO. : 9,556,058 B2
APPLICATION NO. : 14/456354
DATED : January 31, 2017
INVENTOR(S) : Matthew John Dejneka et al.

It is certified that error appears in the above-identified patent and that said Letters Patent is hereby corrected as shown below:

On the Title Page

In Column 2, item (56), Other Publications, Line 4, delete "Mass-" and insert -- glass- --, therefor.

In Column 2, item (57), Abstract, Line 2, after "$T^{35kp}$" insert -- at --.

In the Claims

In Column 15, Line 49, Claim 6, delete "$Al_2O_3 \geq 0$" and insert -- $Al_2O_3 \geq 0$ --, therefor.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*